(12) United States Patent
Swenson et al.

(10) Patent No.: US 8,762,488 B2
(45) Date of Patent: Jun. 24, 2014

(54) CLIENT-SELECTED NETWORK SERVICES

(75) Inventors: Erik R. Swenson, San Jose, CA (US);
Nitin Bhandari, Fremont, CA (US)

(73) Assignee: Opera Software Ireland Limited,
Dublin (IE)

( * ) Notice: Subject to any disclaimer, the term of this patent is extended or adjusted under 35 U.S.C. 154(b) by 143 days.

(21) Appl. No.: 13/300,152

(22) Filed: Nov. 18, 2011

(65) Prior Publication Data

US 2012/0131138 A1    May 24, 2012

Related U.S. Application Data

(60) Provisional application No. 61/415,314, filed on Nov. 18, 2010.

(51) Int. Cl.
*G06F 15/16* (2006.01)
*G06F 15/173* (2006.01)

(52) U.S. Cl.
USPC ............ 709/217; 709/224; 709/226; 709/229

(58) Field of Classification Search
USPC ................ 709/203, 223, 226, 217, 224, 229;
725/110; 370/229, 331
See application file for complete search history.

(56) References Cited

U.S. PATENT DOCUMENTS

| | | | |
|---|---|---|---|
| 6,141,693 A | 10/2000 | Perlman et al. | |
| 6,823,392 B2 | 11/2004 | Cherkasova et al. | |
| 6,981,045 B1 | 12/2005 | Brooks | |
| 7,114,174 B1 | 9/2006 | Brooks et al. | |
| 7,444,418 B2 | 10/2008 | Chou et al. | |
| 2003/0070081 A1 | 4/2003 | Wee et al. | |
| 2003/0093810 A1 | 5/2003 | Taniguchi | |
| 2005/0060411 A1 | 3/2005 | Coulombe et al. | |
| 2006/0268697 A1* | 11/2006 | Oz et al. .......... | 370/229 |
| 2007/0076714 A1 | 4/2007 | Ananthakrishnan et al. | |
| 2008/0151758 A1 | 6/2008 | Weinrib et al. | |
| 2008/0192760 A1 | 8/2008 | Baeder et al. | |
| 2009/0006533 A1 | 1/2009 | Guo | |
| 2009/0083408 A1* | 3/2009 | Hecht et al. ........... | 709/223 |
| 2009/0172757 A1* | 7/2009 | Aldrey et al. ......... | 725/110 |
| 2009/0254672 A1 | 10/2009 | Zhang | |
| 2010/0002685 A1 | 1/2010 | Shaham et al. | |
| 2010/0017506 A1 | 1/2010 | Fadell | |
| 2010/0106770 A1 | 4/2010 | Taylor et al. | |
| 2010/0150102 A1* | 6/2010 | Li et al. ............... | 370/331 |

(Continued)

OTHER PUBLICATIONS

International Search Report and Written Opinion, PCT Application No. PCT/US11/61449, Apr. 2, 2012, 10 pages.

(Continued)

*Primary Examiner* — Quang N Nguyen
(74) *Attorney, Agent, or Firm* — Fenwick & West LLP

(57) ABSTRACT

A system and a method are disclosed for authenticating a user request to determine whether to optimize content requested by the user based on a user profile, a network provider profile, network conditions and the user's service level with an application requesting the content. A user profile provides, for example a data rate plan subscribed to by the user, the user's device type, etc. Network provider profile provides whether the network provider has subscribed to optimization services. Similarly, user's service level provides whether the application is subscribed to receive optimized data. If the user, the network and the application provide for optimization or if the network is congested or busy, the user is provided with a destination address wherein the user may retrieve optimized content.

24 Claims, 4 Drawing Sheets

(56) References Cited

U.S. PATENT DOCUMENTS

| | | |
|---|---|---|
| 2010/0174952 A1 | 7/2010 | Anastas et al. |
| 2010/0266049 A1 | 10/2010 | Hashimoto et al. |
| 2010/0268836 A1 | 10/2010 | Jabri et al. |
| 2010/0269128 A1 | 10/2010 | Gordon |
| 2010/0274664 A1 | 10/2010 | Fernandez Gutierrez |
| 2010/0281042 A1 | 11/2010 | Windes et al. |
| 2010/0293554 A1 | 11/2010 | Rastogi et al. |
| 2010/0299453 A1 | 11/2010 | Fox et al. |
| 2011/0265134 A1 | 10/2011 | Jaggi et al. |
| 2011/0280216 A1 | 11/2011 | Li et al. |
| 2011/0289108 A1 | 11/2011 | Bhandari et al. |

OTHER PUBLICATIONS

PCT International Search Report and Written Opinion, PCT Application No. PCT/US12/33655, Sep. 7, 2012, 16 pages.

PCT International Search Report and Written Opinion, PCT Application No. PCT/US12/33658, Aug. 10, 2012, 12 pages.

United States Office Action, U.S. Appl. No. 13/448,214, Jul. 19, 2012, 18 pages.

United States Office Action, U.S. Appl. No. 13/448,227, May 29, 2012, 14 pages.

U.S. Appl. No. 61/334,548, filed May 13, 2010, Inventors S. Li et al.

\* cited by examiner

CLIENT-SELECTED NETWORK SERVICES

CROSS REFERENCE TO RELATED APPLICATIONS

This application claims the benefit of U.S. Provisional Application No. 61/415,314 filed Nov. 18, 2010, which is incorporated by reference in its entirety.

BACKGROUND

1. Field of Art

The disclosure generally relates to the field of providing network services, and particularly to identifying appropriate network services for a client computing device.

2. Description of the Related Art

Mobile computing devices are often used to perform a variety of tasks by sending and receiving data over cellular networks. However, cellular networks often do not have the capacity or throughput speed to execute user requests in a timely manner. Therefore, mobile computing device users experience slow download speeds when viewing content retrieved over a network. Similarly, videos streams requested on mobile computing devices over cellular networks are often interrupted during playback to enable loading and buffering of the video stream. As such, users are often dissatisfied with a user experience provided by the mobile computing devices. Additionally, large downloads or video streams use significant network resources and often cause a network to slow down further. As such, network carriers generally want to limit the usage of network resources when appropriate.

In one instance, network carriers install network equipment in-line or in a carrier's network to limit usage that may significantly sap network resources. In other instances, the in-line equipment may provide different bandwidth or speed to certain mobile computing devices based on their capabilities or a contract with the network carrier. In other instances yet, the in-line equipment may be used to send user requests to an optimization server wherein an optimized video stream may be provided to the user and wherein the optimized video stream uses fewer resources on the cellular network. However, in-line equipment is expensive and must be installed by network carriers. Additionally, software executing on mobile computing devices may not be aware of when in-line equipment is redirect requests made on the network. As such, software programs are unable to provide a user experience that is tailored to a mobile computing device's network capabilities.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A method, system and computer readable medium comprising instructions for enabling network services for a request for network resource is provided. A request over a network is intercepted and received, wherein in the received request is for content that can be optimized and wherein the request originates at a client device. A user profile associated with a user of the client device is identified, wherein a user profile includes a data rate plan of the user associated with a network provider. Additionally, conditions of the network associated with the intercepted request and a customer service level provided by an application executing on the client device are identified. In one instance, a determination is made to provide optimized content responsive to the intercepted request based on one or more of the data provided in the user profile, the network conditions and the customer service level.

System Architecture

Figure 1:
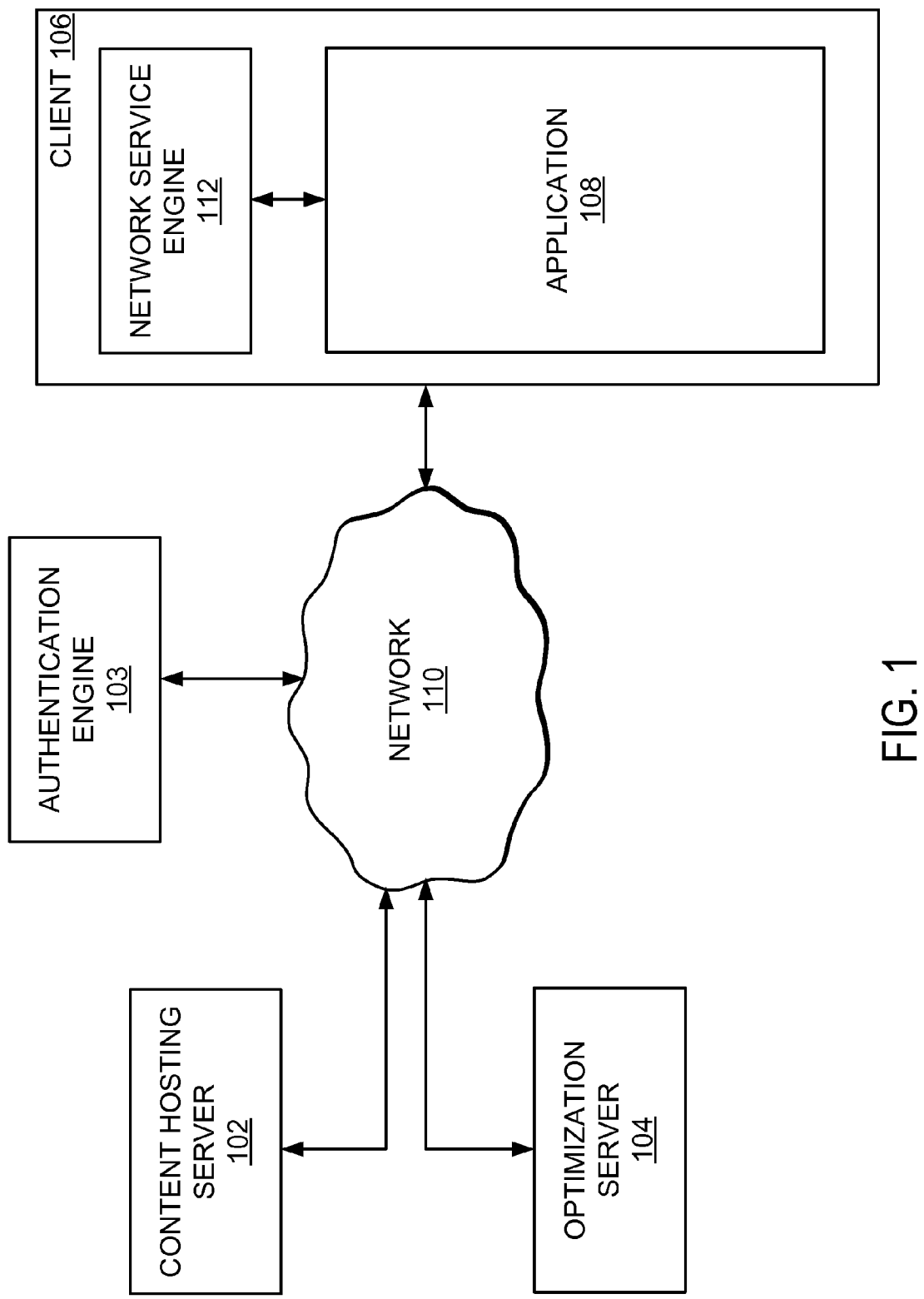
FIG. 1 is a high-level block diagram of a system environment according to one embodiment.

FIG. 1 is a high-level block diagram of a computing environment 100 according to one embodiment. It includes a content hosting server 102, an authentication engine 103, an optimization server 104, a client computing device 106 comprising a network service engine 112 and an application 108 executing on the client computing device 106.

At a high level, a content hosting server 102 provides content to display on a client computing device 106 responsive to a user request. The content may include, for example, webpages, audio/video files and/or other electronic documents. The content hosting server 102 can be, for example, a major Internet web site operated by a national media outlet, a personal blog on a web server operated by a lone individual, and/or another distributor of webpages. While only one content hosting server 102 is shown in FIG. 1, embodiments of the system can have thousands or millions of different hosting servers. Only one content hosting server 102 is shown for purposes of clarity.

In one embodiment, the client computing device 106 represents any entity operated by a user that receives content over a network 110. The client computing device 106 is sometimes referred to as a "mobile device" or a "display device." In one embodiment, the client computing device 106 includes a computer system utilized by an end-user to communicate with other computers or servers on the network 110 in order to view content. In other embodiments, the client computing device 106 includes a network-capable device other than a computer system, such as a personal digital assistant (PDA), a cellular telephone, a smartphone, a pager, a television "set-top box" etc. Although FIG. 1 illustrates only one client computing device 106, embodiments of the present invention can have thousands or millions of client devices connected to the network 110.

In one embodiment, the network service engine 112 receives user requests made on the application 108 and interfaces with the authentication engine 103 to determine how to handle the user request. As such, the network service engine 112 may receive instructions on how to redirect or handle a user request made on the application 108. The network service engine 112 may be a program or a plug-in executing on a client computing device 106 or may be part of the application 108.

The authentication engine 103 receives user requests from the client computing device 106 and determines how to handle the request. In one embodiment, the authentication engine 103 determines that a user should be provided with optimized results responsive to a request based on one or more criteria, such as network capabilities, whether a network carrier has subscribed for optimization services, network details associated with a user, etc. Optimized results are tailored to a user's network and device capabilities as well as a user's contract with a network carrier. As such, optimized results may minimize loading and buffering time and may provide an uninterrupted video playback services to a user requesting to stream video content. If a user should be provided with optimized results, the authentication engine 103 directs the application 108 to request optimized content from the optimization server 104.

The optimization server 104 optimizes content provided by a content hosting server 102 and provides the optimized content to the client computing device 106. In one embodiment, the optimization server 104 receives a request for optimized content from the client computing device 106 responsive to a determination by the authentication engine 103. The optimization server 104 optimizes content responsive to the request and sends the optimized content to the client computing device 106, wherein the optimized content may be displayed to a user within the application 108. Examples of content that may be optimized by the optimization server 104 include but are not limited to video optimization, webpage compression and email compression/de-duplication. In one embodiment, in substantially real-time, video traffic is optimized by the optimization server 104 through the use of transcoding, transrating, etc. The optimization services can modify a video's resolution, frame rate, CODECs, bitrates, etc. Additionally, the optimization server 104 may cache video files and optimized files to reduce network load and improve user experience. In addition, the optimization server 104 may perform image compression and text compression to one or more webpages to reduce their size and sends the optimized files to the client computing device 106 using fewer network resources.

In one embodiment, the optimization server 104 interfaces with the client computing device 106 by receiving a cookie or a token associated with a user request. In such an instance, the optimization server 104 interfaces with the authentication server 103 and receives detailed information on how to process the request.

The application 108 executing on the client computing device 106 may include any application capable of executing on a client device and interfacing with the network 112, including for example, a browser. Examples of browsers include SKYFIRE, FIREFOX, INTERNET EXPLORER, CHROME, etc. The application 108 interfaces with a user and receives user requests to retrieve content over a network 110 and display it. In one embodiment, the user request gets redirected to an optimization server 104, wherein the application 108 receives optimized results to display to a user on the client computing device 106.

The network 110 represents communication pathways between the content hosting server 102, the authentication engine 103, the optimization server 104 and the client computing device 106. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc.

Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), code division multiple access 2000 (CDMA 2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Example Computing Machine Architecture

Figure 2:
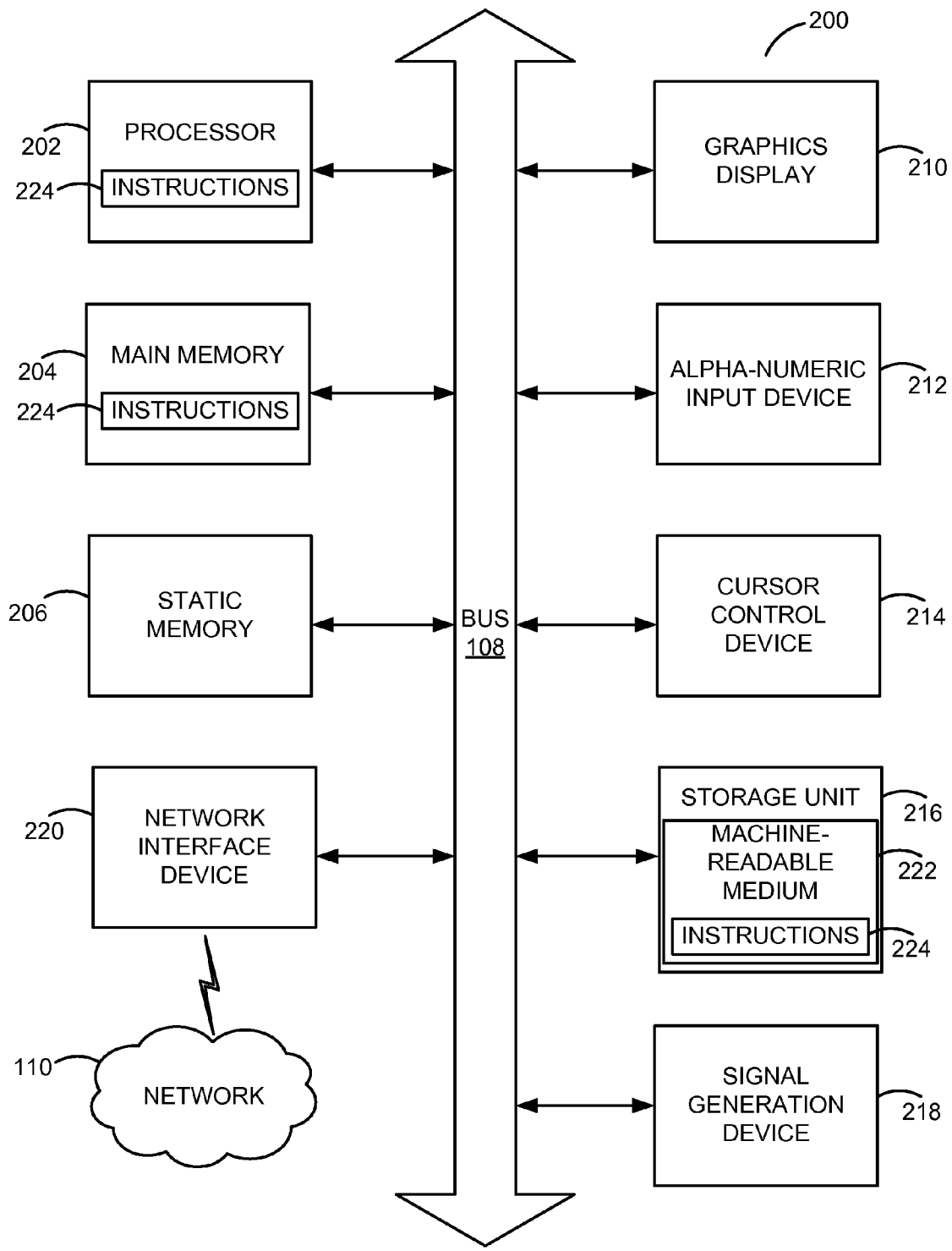
FIG. 2 is a high-level block diagram illustrating a functional view of a typical computer system for use as one of the entities illustrated in the environment of FIG. 1 according to one embodiment.

FIG. 2 is a high-level block diagram illustrating one embodiment of a typical computing machine 200. It is noted that the computing machine 200 may be a system or part of a system, e.g., two or more machines operating together or one or more machines operating with one or more other devices. The computing entities illustrated in FIG. 1 (e.g., the content hosting server 102, the authentication engine 103, the optimization server 104 and the client computing device 106) are structured similarly to the computing machine 200 and can be further customized for particular functional configurations (e.g., operations) as described further herein.

FIG. 2 illustrates components of an example machine able to read instructions from a machine-readable medium and execute them in one or more processors and/or controllers. Specifically, FIG. 2 shows a diagrammatic representation of a machine in the example form of a computer system 200 within which instructions 224 (e.g., software code) for causing the machine (e.g., having the one or more processors and/or controllers) to perform anyone or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform anyone or more of the methodologies discussed herein.

The example computer machine 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 108. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over the network 110 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Configuration for Authenticating a Request

Figure 3:
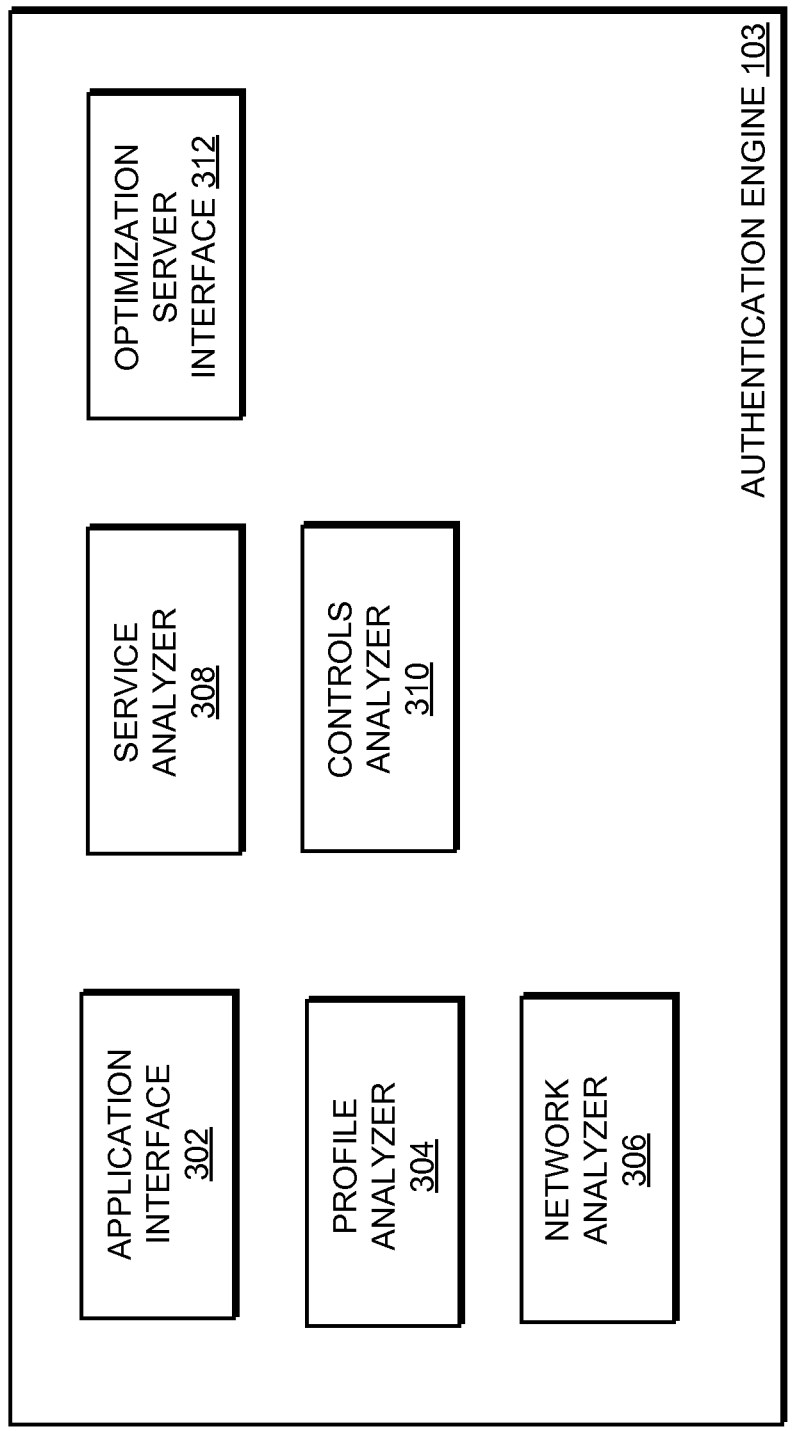
FIG. 3 illustrates one embodiment of a high level block diagram of an engine for redirecting network services.

Referring now to FIG. 3, it illustrates an embodiment of the authentication engine 103, in accordance with an embodiment. The authentication engine 103 is illustrated as a high-level block diagram of modules configured to interface with a content hosting server 102, an optimization server 104 and a client computing device 106 to receive user requests made on an application 108. In one embodiment, the authentication engine 103 includes an application interface 302, a profile analyzer 304, a network analyzer 306, a service analyzer 308, a controls analyzer 310 and an optimization server interface 312.

The application interface 302 interfaces with an application 108 by receiving user requests to user network 110 resources. As described in the specification, in one embodiment, a network service engine 112 or an operating system executing on a client computing device 106 may intercept user requests for network 110 services. In such an instance, the application interface 302 interfaces with the network service engine 112 or the operating system of the client computing device 106. Additionally, the network service engine 112 also filters network requests such that only certain requests are forwarded to the application interface 302. In another embodiment, a background process copies a state and forwards it to the client device such that the decision is made on the client device. In such an instance, the decision the communication may not be in substantially real-time. In one embodiment, the application 108 or the network service engine 112 determines if a user request can be optimized by an optimization sever 104 and selectively sends those requests to the application interface 302. In addition to receiving intercepted user requests for network 110 services, the application interface 302 sends redirect requests to the application 108 if the user should be provided with optimized results responsive to the request.

In one embodiment, requests for content that may be optimized are identified and intercepted at the client computing device 106. For example, the network service engine 112 may intercept user requests for network resources at request origin. The network service engine 112 or the application 108 may receive the user request and send it to the authentication engine 103. In another embodiment, the network service engine 112 parses requests on the client computing device 106 to identify request that may be optimized. For example, video files may be identified based on packet headers. In other instances, the network service engine 112 parses the request by identifying file name extensions with .FLV, .F4V or .MP4 to identify FLASH content. In other instances yet, the network service engine may identify network responses to identify traffic patterns. If for example, a video file is requested, the network service engine 112 may look for 'F' 'L' 'V' or 'f' 't' 'y' 'p' to identify FLV and MP4 video file requests. In another embodiment, an in-line device in the network 110 may monitor network requests and responses to identify traffic pattern that can be optimized. In such an instance, an in-line network device interfaces with the authentication engine 103 and the optimization server 104 to enable optimizing content and then providing it to requesting users.

The profile analyzer 304 identifies a user profile to determine whether to provide optimization services to the client computing device 106 used by the user associated with the user profile. The user profile contains information about a user, including but not limited to the user's rate plan with a network 110 carrier, the user's device type and location from where network resources are requested, such as roaming, etc. In one embodiment, if any information in a user's profile provides that the user should receive optimization services, the profile analyzer 304 redirects the user request to the optimization server 104. For example, if a user has a rate plan that subscribes the user to receive optimization services, the profile analyzer 304 redirects the user request to the optimization server 104. In one embodiment, the profile analyzer 304 receives a user profile from the client computing device 106 or from a network 110 carrier. In other embodiments, the profile analyzer 304 uses Lightweight Directory Access Protocol (LDAP) or Remote Authentication Dial In User Service (RADIUS) to access directory information associated with a requesting user over an internet protocol (IP) network. The directory services may provide a user's profile information to enable the profile analyzer 304 to identify profile information associated with the user.

The network analyzer 306 determines a network provider associated with a network request to determine whether to provide optimization services to the client computing device 106. In one embodiment, the network analyzer 306 identifies a network provider associated with the network request to determine whether to provide optimization services. A network provider, for example, may sign up for a service with the authentication engine 103 to provide optimization service to its users. If the network provider requests optimization services, the network analyzer 306 redirects a user request such that the client computing device 106 receives optimized content from the optimization server 104.

In one embodiment, the network analyzer 306 analyzes network 110 conditions to determine whether to provide optimization services to the client computing device 106. In one embodiment, the network analyzer 306 identifies network provider or network conditions by determining a cellular tower identification (ID) or a base station ID associated with a network 110, whether a WiFi or other network services are available concurrently, a time of day when the data is request, network congestion and a type of network 110 over which data is requested, including but not limited a 3G or a 4G networks. Based on the network data, the network analyzer 306 redirects a user request such that the client computing device 106 receives optimized content from the optimization server 104. Similarly, the network analyzer 306 may determine to provide optimization services based on time of day or network congestion. In one embodiment, thus, the optimization server 104 may be used in a selective manner, allowing users or network providers to minimize costs associated with optimization services.

The service analyzer 308 determines a user's service level associated with an application 108 to determine a level of optimization services to provide to the client computing device 106. Applications 108 or software providers may assign different service levels to different customers. For example, users may be premium subscribes who pay a premium for certain applications 108 over other subscribers. In such an instance, the application 108 may provide assign a premium service level to such customers. In other instances, the application 108 may assign a service level to a customer based on costs associated with computation complexity requested by the user. In one embodiment, the service analyzer 308 determines an optimization service level for a user based on information provided by the application 108.

The controls analyzer 310 parental controls or content filters to determine whether to provide optimization services responsive to a user request. Parental controls or content filters provide content that is suitable for displaying on the client computing device 106. For example, if a user is not authorized to view a particular type of website or a video, including those containing violent or sexually graphic content, the controls analyzer 310 does not provide a redirect request wherein the client computing device 106 would receive optimized content for unauthorized content. In one embodiment, the controls analyzer 310 interfaces with the client computing device 106 wherein a user may provide a password to authorize locked or otherwise unauthorized content. In other embodiments, the authentication engine 103 may provide guidelines on content that is authorized to be optimized by the optimization engine 104. If the content is authorized, the controls analyzer 310 redirects a user request such that the client computing device 106 receives optimized content from the optimization server 104. In another embodiment, the controls analyzer 310 blocks content that should be filtered based on filter settings or parental controls settings.

The optimization server interface 312 interfaces with an optimization server 104 if the user should be provided with optimized content and determines a bandwidth profile and destination address wherein the user may receive optimized content. For example, if a user requested to stream video content, and the authentication engine 103 determines that the user is eligible to receive optimized content, the optimization server interface determines an appropriate bandwidth profile of an optimized video, for example 400×240 video at 300 kbps, to be received from the optimization server 104. In addition, the optimization server interface 312 determines a hostname/IP address that an application 108 executing on a client device 106 may use to retrieve optimized video associated with the user request.

In one embodiment, the optimization server interface 312 provides client feedback to the optimization server 104. In other embodiments, the client computing device 106 provides feedback to the optimization server 104 directly to optimization rates such as video bitrates. Modes of feedback include, but are not limited to packet-level acknowledgement, per-packet feedback on receive times, aggregate information such as jitter, latency and throughput of the optimized content, network and/or player buffer fullness. In one embodiment, TCP/IP window information is used to measure network congestion.

In one embodiment, the authentication engine 103 determines whether to redirect a user request such that the client computing device 106 receives optimized content based on a determination by one or a combination of the profile analyzer 304, the network analyzer 306, the service analyzer 308 and the controls analyzer 310.

Process for Authenticating a Request

Figure 4:
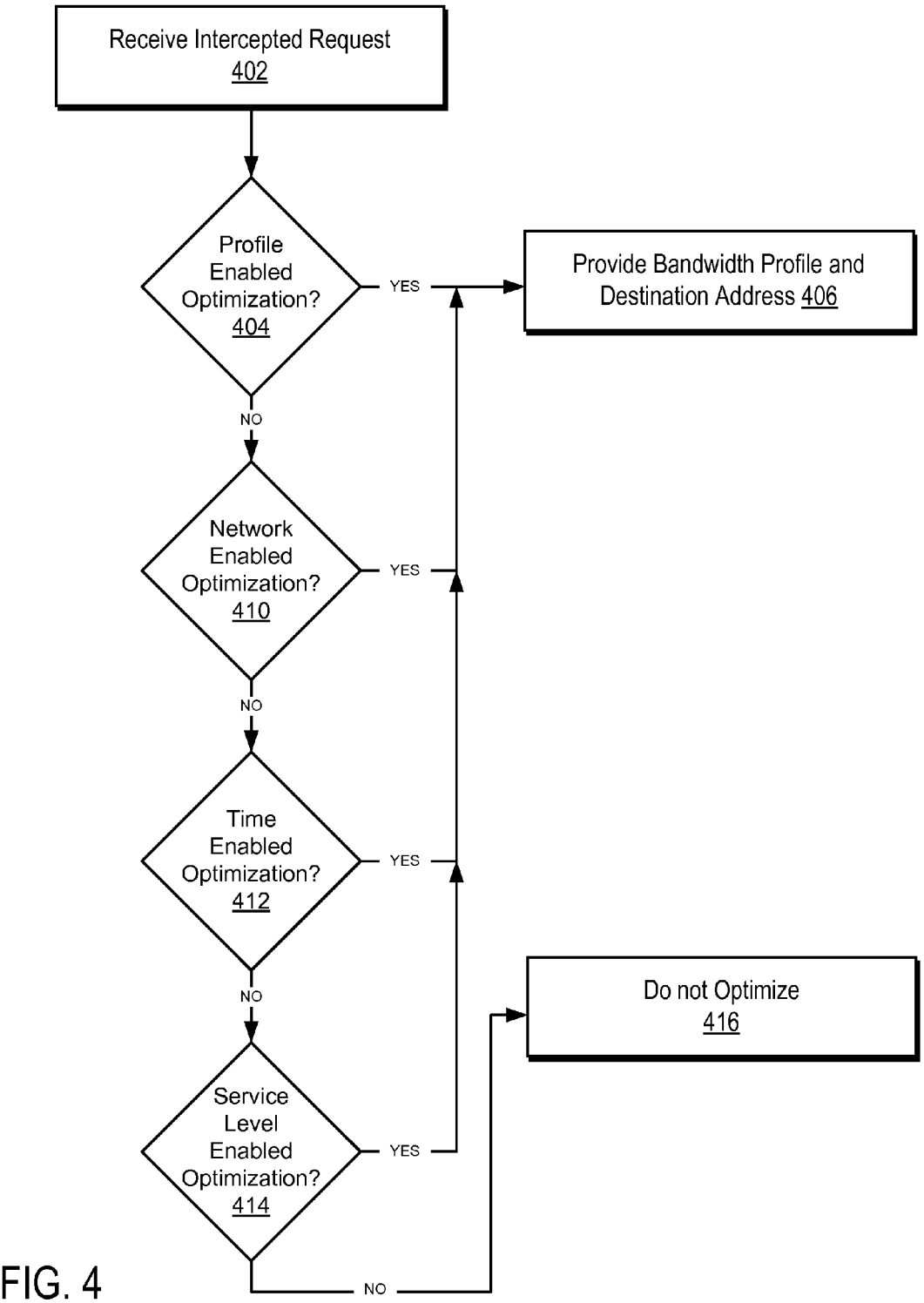
FIG. 4 illustrates one embodiment of a process for redirecting network services.

FIG. 4 illustrates one embodiment of a process for authenticating a user request, in accordance with an embodiment. The process starts when an intercepted user request is received 402. The intercepted user request may include a user request for content that can be optimized. Content that can be optimized includes, but is not limited to video files, webpages, emails, etc. The user requests can be intercepted at the client or by an in-line device in a network. In one embodiment, an intercepted user request for content that can be optimized is received 402 by an authentication engine. In another embodiment, the authentication is performed on the client device based on updates received from the authentication engine.

In one embodiment, the process determines if a user profile enables 404 optimization of content requested by the user. A user profile may include information such as the user's rate plan, device type, location from where network resources are requested, etc. If a user profile provides that the content requested by the user should be optimized 404, the content's bandwidth profile and destination address is generated 406 as discussed in the specification below. If the user's profile does not provide to enable optimization or its unclear, the user is not provided 416 with optimized content.

In one embodiment, the process determines whether to redirect a user request to an optimization server based on network type and condition. Network type and condition include, 3G and 4G network types, congestion windows providing network conditions, cellular tower/based station ID, etc. If the network is congested or a network type is associated with optimization, the process generates 406 bandwidth profile and destination address 406 as discussed in the specification below. If the network conditions and type do not require optimization or it is unclear, the user is not provided 416 with optimized content.

In one embodiment, the process determines whether to redirect a user request to an optimization server based on whether the request is made during peak traffic times. For example, the process determines a time of day associated with a request and determines whether the request coincides with peak traffic times. If the request coincides with peak traffic times, the requested is redirected to an optimization server wherein a client device receives optimized content. If the request is not associated with a peak traffic time, the client device is not provided 416 with optimized content.

In one embodiment, the process determines a service level 414 associated with an application requesting optimization. An application, for example, may provide varying levels of optimization based on a rate paid by the user and/or based on the costs associated with computational complexity. If the service level is determined to be associated with an application, the process redirects the user request to an optimization server wherein the client device receives optimized content. If the application provides that the user's service level 414 does not require optimization, the client device is not provided 416 with optimized content.

In one embodiment, if content requested by an intercepted request 402 is determined to request optimized content, the process generates and provides 406 a bandwidth profile of the optimized content and a destination address wherein a client device can retrieve optimized content. For example, if a video file requested by a user is determined to be optimized, the process may provide the optimized video's bandwidth profile of 400×200 video at 3000 kbps. Similarly, the process provides a hostname/IP address of an optimization server wherein the client device may request optimized content.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of modules (e.g., components, engines, or mechanisms), for example, as described in FIGS. 1 and 3. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processor 202, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 204 or storage 216). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., computer 200) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Upon reading this disclosure, those of skill in the art will appreciate still additional alternative structural and functional designs for a system and a process for authenticating a user request to determine whether to optimize content requested by the user based on a user's profile, network conditions, time of day, an service level with an application requesting the content. For example, the server encodes the text and image data such that the text data does not lose any resolution and can be rendered perfectly at any zoom level on the client device. Image data is considered less important to the browsing experience, however, as is delivered as a low resolution image data which may appear blocky and stretched out during an intermediate stage after the zoom in and before a hi-resolution image is retrieved and delivered to the client device. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for enabling network services for a request for network resources, the method comprising:
receiving an intercepted request for network resources on a service provider network, the intercepted request indicating content to be provided to a client device by the service provider network;
identifying a user profile associated with the client device, the user profile including a data rate plan of a subscriber of the service provider network;
identifying conditions of the service provider network associated with the intercepted request;
identifying a customer service level of an application executing on the client device;
determining whether to optimize the content to be provided to the client device based on at least one of the user profile, conditions of the service provider network, and the customer service level of the application; and
transmitting, in response to a determination to optimize the content, an instruction to redirect the intercepted request to an optimization server for optimizing the content to be provided to the client device, the optimization server optimizing the content to be provided to the client device and providing the optimized content to the client device.

2. The method of claim 1, wherein the intercepted request is received from the application executing on the client device.

3. The method of claim 1, wherein the intercepted request indicating content to be provided to the client device by the service provider network is identified based on filename extensions associated with the intercepted request.

4. The method of claim 1, wherein the intercepted request indicating content to be provided to the client device by the service provider network is identified based on a network response to the intercepted request, the intercepted request originating from the client device.

5. The method of claim 1, wherein the user profile includes a client device type, including network communications capability of the client device and a location from where network service is requested, including whether the user is at a location associated with the data rate plan.

6. The method of claim 1, wherein the user profile is retrieved from a distributed directory using a Lightweight Directory Access Protocol (LDAP) or a Remote Authentication Dial In User Servicev (RADIUS).

7. The method of claim 1, wherein identifying conditions of the service provider network further comprising:
   identifying a network type;
   identifying network congestion; and
   identifying if network is in peak traffic time.

8. The method of claim 7, wherein identifying a network type comprises identifying a 3G or 4G network type.

9. The method of claim 1, wherein the customer service level of the application executing on the client device includes a subscription level of the subscriber with the application.

10. The method of claim 1, further comprising:
   identifying filters associated with content requested by the intercepted request, the filters including at least one of parental controls provided by a user and global policy filters providing content that may not be optimized; and
   determining to provide at least one of optimized content and any content in response to the intercepted request if the requested content is allowed by the filters.

11. The method of claim 1, further comprising sending a destination address wherein the client device may retrieve optimized content if a determination is made to provide optimized content in response to the intercepted request.

12. The method of claim 1, further comprising sending a bandwidth profile to the client device if a determination is made to provide optimized content in response to the intercepted request.

13. The method of claim 1, wherein optimizing the content to be provided to the client device comprises transcoding video content to modify one or more of a resolution, frame rate, CODEC, or bitrate of the content.

14. A non-transitory computer-readable storage medium storing executable computer program instructions for enabling network services for a request for network resources, the executable computer program instructions comprising instructions for:
   receiving an intercepted request for network resources on a service provider network, the intercepted request indicating content to be provided to a client device by the service provider network;
   identifying a user profile associated with the client device, the user profile including a data rate plan of a subscriber of the service provider network;
   identifying conditions of the service provider network associated with the intercepted request;
   identifying a customer service level of an application executing on the client device;
   determining whether to optimize the content to be provided to the client device based on at least one of the user profile, conditions of the service provider network, and the customer service level of the application; and
   transmitting, in response to a determination to optimize the content, an instruction to redirect the intercepted request to an optimization server for optimizing the content to be provided to the client device, the optimization server optimizing the content to be provided to the client device and providing the optimized content to the client device.

15. The non-transitory computer-readable storage medium of claim 14, wherein the intercepted request is received from the application executing on the client device.

16. The non-transitory computer-readable storage medium of claim 14, wherein the intercepted request indicating content to be provided to the client device by the service provider network is identified based on filename extensions associated with the intercepted request.

17. The non-transitory computer-readable storage medium of claim 14, wherein the user profile including a client device type, including network communications capability of the client device and location from where network service is requested, including whether the user is at a location associated with the data rate plan.

18. The non-transitory computer-readable storage medium of claim 14, wherein identifying conditions of the service provider network further comprising instructions for:
   identifying a network type;
   identifying network congestion; and
   identifying if network is in peak traffic time.

19. The non-transitory computer-readable storage medium of claim 18, wherein identifying a network type comprises identifying a 3G or 4G network type.

20. The non-transitory computer-readable storage medium of claim 14, wherein the customer service level of the application executing on the client device including a subscription level of the subscriber with the application.

21. The non-transitory computer-readable storage medium of claim 14, further comprising instructions for:
   identifying filters associated with content requested by the intercepted request, the filters including at least one of parental controls provided by a user and global policy filters providing content that may not be optimized; and
   determining to provide optimized content in response to the intercepted request if the requested content is allowed by the filters.

22. The non-transitory computer-readable storage medium of claim 14, further comprising instructions for sending a destination address wherein the client device may retrieve optimized content if a determination is made to provide optimized content in response to the intercepted request.

23. The non-transitory computer-readable storage medium of claim 14, further comprising instructions for sending a bandwidth profile to the client device if a determination is made to provide optimized content in response to the intercepted request.

24. The non-transitory computer-readable storage medium of claim 14, wherein optimizing the content to be provided to the client device comprises transcoding video content to modify one or more of a resolution, frame rate, CODEC, or bitrate of the content.

* * * * *